United States Patent Office 3,424,814
Patented Jan. 28, 1969

3,424,814
PROCESSES FOR PRETREATING A CATALYST AND FOR POLYMERIZING LOWER ALPHA-OLEFINS
James Keith Hambling, Frimley, and John Grebbell, Woking, England, assignors to The British Petroleum Company Limited, London, England, a corporation of England
No Drawing. Filed Apr. 7, 1966, Ser. No. 540,833
Claims priority, application Great Britain, Apr. 14, 1965, 16,110/65
U.S. Cl. 260—683.15                10 Claims
Int. Cl. C07c 3/20; B01j 11/06

ABSTRACT OF THE DISCLOSURE

Lower alpha-olefins are dimerised or co-dimerised to produce a product consisting predominantly of alpha-olefins by contacting the feed olefins with a catalyst comprising metallic sodium dispersed on anhydrous potassium carbonate, the fresh catalyst having been hydrided by treatment with hydrogen prior to use.

This invention relates to the pretreatment of polymerisation catalysts and to the utilisation of the pretreated catalysts. In particular the invention relates to the pretreatment of catalysts for the dimerisation and co-dimerisation of lower alpha-olefins and to the dimersation and co-dimersation of such alpha olefins using such pretreated catalysts.

In British Patent No. 933,253 there is disclosed a catalyst suitable for use in the polymerisation of olefinic hydrocarbons comprising an elemental alkali metal having an atomic number less than 19 dispersed on an anhydrous potassium compound. A particular example is a catalyst comprising elemental sodium dispersed on anhydrous potassium carbonate. The application of such catalysts to the dimerisation of propylene to a hexene product predominating in 4-methylpentene-1 is described.

It has now been found that if such catalysts as are described in the above patent are subjected to a pretreatment with hydrogen before their use, their active lifetimes are prolonged significantly, and the time taken to activate fully the catalyst system and achieve the maximum yield is considerably reduced.

Accordingly one aspect of the present invention provides a process for pretreating a catalyst comprising a dispersion of metallic sodium on an anhydrous potassium compound, which process comprises subjecting the catalyst, before use, to treatment with hydrogen.

The catalyst is suitably treated with hydrogen at pressure up to 4000 p.s.i.g., and at a temperature in the range 50°–350° C., preferably 150°–250° C., for any time up to 30 hours.

The catalysts pretreated according to the invention may be prepared by dispersing sodium on the potassium compound in a number of ways including vapour deposition of the metal, deposition in a solution in liquid ammonia with subsequent evaporation of the ammonia, deposition of the metal from a heat-decomposable compound such as sodium hydride or preferably by stirring the molten metal with the potassium compound at temperatures in excess of the M.P. of sodium, e.g., 150°–400° C., preferably 200°–350° C., the potassium compound being selected such that it does not melt, sinter or decompose at the deposition temperature.

Preferably the potassium compound is an inorganic salt, e.g., a silicate, sulphate or halide; most preferably the potassium compound is potassium carbonate.

The preferred catalysts are those comprising 1–20% by weight metallic sodium dispersed on a pelletized or granular anhydrous potassium compound, e.g., metallic sodium dispersed on ⅛ inch pellets of the potassium compound.

The catalysts, pretreated according to the present invention, are very suitable for dimerising propylene to hexene fractions predominating in 4-methylpentene-1; for dimerising isobutene to useful trimethylpentenes, e.g., 2,4,4-trimethylpentene-1 and -2; for co-reacting butenes with ethylene to provide useful hexenes, e.g., 3-methylpentene-1 and for co-reacting propylene and ethylene to provide useful pentenes, e.g., pentene-1.

Therefore according to another aspect of the present invention there is provided a process for the dimerisation or co-dimerisation of lower alpha-olefins, comprising contacting the feed alpha-olefins with a catalyst comprising metallic sodium dispersed on an anhydrous potassium compound, which catalyst has been pretreated with hydrogen.

Suitable temperatures for effecting the dimerisation or co-dimerisation of alpha olefins according to the invention are in the range 0.200° C.

Dimerisation of propylene is preferably effected at a temperature in the range 100°–200° C. whereas co-dimerisation of ethylene and butenes is preferably effected at a temperature in the range 60°–85° C.

Pressures up to 4000 p.s.i.g. may be employed.

Dimerisation of propylene is preferably effected at a pressure in the range 1400–1700 p.s.i.g. and co-dimerisation of ethylene with a butene is preferably effected at a pressure in the range 100–1200 p.s.i.g.

The reaction may be carried out batchwise or in a continuous manner. In the latter case suitable feed rates are in the range 0.5–10 v./v./hour.

The process may be carried out either in the presence or absence of a normally liquid solvent, e.g., a paraffinic hydrocarbon such as n-heptane.

The invention will be more clearly understood with reference to the following examples.

Example 1

A 4.3 percent weight dispersion of sodium on anhydrous potassium carbonate was treated with hydrogen at 1500 p.s.i.g. for 20 hours at 150° C. Propylene was passed over the treated catalyst at 160° C. and 1500 p.s.i.g. using a liquid hourly space velocity of 1.

(a) The catalyst half-life (from 73–36.5 percent weight propylene conversion to polymer) was 50 days.

(b) The time taken to achieve the maximum yield was 2 days.

After 200 hours on stream the hexene product analysis was as follows:

TABLE 1.—HEXENE ANALYSIS

| Component: | Percent |
|---|---|
| 4MP1 | 84.8 |
| 4MP2 (c) | 2.1 |
| 4MP2 (t) | 6.6 |
| 2MP1 | 0.1 |
| Hexene-1 | 4.0 |
| Hexene-3 (c+t) | Trace |
| Hexene-2: | |
| (t) | 0.9 |
| (c) | 0.6 |
| 2MP2 | 0.2 |
| Others | 0.7 |

Example 2

An identical untreated catalyst was reacted with propylene under identical reaction conditions:

(a) The catalyst half-life (from 73–36.5 percent weight propylene conversion to polymer) was 32 days.

(b) The time taken to achieve the maximum yield was 6 days.

Example 3

A 2.2% wt. dispersion of sodium on anhydrous potassium carbonate pellets was treated with hydrogen at atmosphereic pressure and 150° C. for 4 hours.

Propylene was passed over the treated catalyst at 1600 p.s.i.g. and 152° C. using a liquid hourly space velocity of 1.

The hexene analysis of the resulting product is given in the following Table 2.

Example 4

The process described in Example 3 was repeated with the exception that the catalyst was not pretreated with hydrogen.

The hexene analysis of the resulting product is given in the following Table 2.

TABLE 2

| Hexene | Example 3 | Example 4 |
|---|---|---|
| 4MP1 | 83.8 | 81.1 |
| 4MP2 (c+t) | 7.9 | 10.0 |
| Linear hexenes | 8.1 | 8.7 |
| Others | 0.2 | 0.2 |

The increased stability of the hydrogen treated catalyst described with reference to Example 3 resulted in a 12% increase in the absolute productivity of the catalyst, expressed as g. hexenes per g. catalyst, when compared with the catalyst described with reference to Example 4 over a 1500 hour reaction period.

It is to be understood that Examples 2 and 4 are provided for purposes of comparison only and that the processes described in Examples 3 and 4 are not processes according to the present invention.

We claim:
1. In a process for pretreating a catalyst comprising metallic sodium dispersed on anhydrous potassium carbonate which catalyst is suitable for use in dimerising lower alpha-olefins and for co-dimersing a mixture of lower alpha-olefins, whereby the life of the catalyst is prolonged, the improvement comprising, pretreating the fresh catalyst, before use, with hydrogen.

2. A process according to claim 1 wherein the catalyst is treated with hydrogen at a pressure up to 4000 p.s.i.g.

3. A process according to claim 1 wherein the catalyst is treated with hydrogen at a temperature in the range 50°–350° C.

4. A process according to claim 3 wherein the catalyst is treated with hydrogen at a temperature in the range 150°–250° C.

5. In a process for dimerising a lower alpha-olefin, and for co-dimersing a mixture of lower alpha-olefins to produce a product predominating in alpha-olefins, which comprises contacting the feed olefin to be treated with a catalyst comprising metallic sodium dispersed on anhydrous potassium carbonate, the improvement comprising, pretreating the fresh catalyst, before use, with hydrogen at a pressure up to 4,000 p.s.i.g.

6. A process according to claim 5 wherein dimerisation or co-dimerisation is effected at a temperature in the range 0°–200° C.

7. A process according to claim 6 wherein the feed olefin is propylene and dimerisation is effected at a temperature in the range 100°–200° C.

8. A process according to claim 6 wherein the feed olefin is a mixtue of ethylene and a butene and co-dimerisation is effected at a temperature in the range 60°–85° C.

9. A process according to claim 7 wherein dimersiation of propylene is effected at a pressure in the range 1400–1700 p.s.i.g.

10. A process according to claim 8 wherein co-dimerisation of ethylene and a butene is effected at a pressure in the range 100–1200 p.s.i.g.

References Cited

UNITED STATES PATENTS

| | | | |
|---|---|---|---|
| 2,881,234 | 4/1959 | Esmay et al. | 260—683.15 |
| 2,952,719 | 9/1960 | Appell | 260—683.15 X |
| 3,104,271 | 9/1963 | Lindsay | 260—683.15 |
| 3,251,895 | 5/1966 | Wilkes | 260—683.15 X |
| 3,260,770 | 7/1966 | Hambling | 260—683.15 |
| 3,207,812 | 9/1965 | Hambling et al. | 260—683.15 |

FOREIGN PATENTS

| | | |
|---|---|---|
| 1,351,167 | 12/1963 | France. |
| 1,356,267 | 2/1964 | France. |

PAUL M. COUGHLAN, Jr., Primary Examiner.

U.S. Cl. X.R.

252—443

UNITED STATES PATENT OFFICE
CERTIFICATE OF CORRECTION

Patent No. 3,424,814                        January 28, 1969

James Keith Hambling et al.

It is certified that error appears in the above identified patent and that said Letters Patent are hereby corrected as shown below:

Column 1, line 29, "dimersation" should read -- dimerisation --; line 30, "co-dimersation" should read -- co-dimerisation --. Column 3, line 6, "atmosphereic" should read -- atmospheric --; same column 3, line 40 and column 4, line 7, "co-dimersing" should read -- co-dimerising --; same column 4, line 23, "dimersiation" should read -- dimerisation --.

Signed and sealed this 17th day of March 1970.

(SEAL)
Attest:

Edward M. Fletcher, Jr.                        WILLIAM E. SCHUYLER, JR.
Attesting Officer                                Commissioner of Patents